United States Patent Office 2,700,663
Patented Jan. 25, 1955

2,700,663

POLYMERIZATION OF LOW MOLECULAR WEIGHT OLEFINS WITH ACETYLENE TREATED MOLYBDENA CATALYSTS

Edwin F. Peters, Chicago, Ill., assignor to Standard Oil Company, Chicago, Ill., a corporation of Indiana No Drawing. Application June 2, 1952, Serial No. 291,337

16 Claims. (Cl. 260—94.9)

This invention relates to an improved process of polymerizing ethylene, propylene, or mixtures thereof, to prepare high-molecular-weight, solid polymers, especially those suitable for use as commercial resins.

In assignee's copending applications, Serial Nos. 223,641, filed April 28, 1951 and 288,501, filed May 17, 1952, an improved process is described and claimed for the preparation of high molecular weight polymers from gas mixtures containing ethylene, propylene, or mixtures of ethylene and propylene. The process includes polymerizing the olefin in the presence of a solvent medium, preferably an aromatic hydrocarbon, and a catalyst (a subhexavalent molybdenum-oxygen compound combined with an active alumina, titania, or zirconia support) at a temperature between about 100° and 300° C., or preferably between 125° and 260° C., and a pressure between atmospheric and 5000 p. s. i. g., preferably between 500 and 2000 p. s. i. g., and removing resinous product from the catalyst by a leaching treatment with a solvent both during the polymerization and in a subsequent separate recovery step. As the polymerization reaction progresses, some of the resinous polymers produced thereby will be dispersed in the solvent medium, but a substantial portion of the product will remain deposited upon the catalyst surfaces. The removal of resinous product from the catalyst is difficult and requires intensive solvent treatment, without even then attaining complete success in product recovery.

A primary object of the present invention is, therefore, the provision of a method to prevent the deposition of strongly adhesive resinous product upon the polymerization catalyst. It is another object of the invention to condition the catalyst so that strongly adherent refractory deposition of resinous polymer upon the catalyst will not occur. It is a further object of the invention to create such an environment within the reaction zone that the tendency of resinous product to form strongly adherent depositions upon the catalyst will be very substantially reduced, even eliminated. The invention has for other objects such advantages or results as will be found in the specification and claims hereinafter made.

The present improvement, whereby the foregoing objects are accomplished, comprises essentially the treatment of the said solid catalyst with an amount between about 0.01 and 5 percent by weight, based on the catalyst, of acetylene at an elevated temperature between about room temperature and 325° C. The acetylene is preferably brought into contact with the polymerization catalyst under polymerization conditions of temperature and pressure (if safely diluted), and the catalyst may be contacted with acetylene during actual polymerization of the olefin. This treatment of the defined polymerization catalyst with acetylene can be accomplished either with pure acetylene or with acetylene that has been diluted with the olefin which is to be polymerized or by an inert gas, such as nitrogen or a low molecular weight saturated hydrocarbon, particularly methane or ethane. Acetylene is effective in treating the catalyst even when it is in extremely low concentration in an inert gas; this was demonstrated by the fact that active polymerization catalyst will reduce the acetylene content of ethylene, propylene, or an inert gas to substantially zero.

The described acetylene treatment greatly reduces the difficulty heretofore encountered in recovering high molecular weight polymer from the reaction product mixture which comprises solvent reaction medium, polymer, and catalyst. While the theory cannot be definitely stated as to whether the acetylene so conditions the catalyst that the polymer does not adhere as tightly to the catalyst or is so altered that it is more soluble in the solvent reaction medium or extractant, the fact remains that polymer can be extracted from the catalyst with considerably less difficulty when acetylene is employed than when it is not. The capacity of solvent extraction equipment in continuous ethylene polymerization processes such as that illustrated in assignee's copending application Serial No. 288,516, filed May 17, 1952, can be considerably reduced.

When the conditioning of catalyst with acetylene is accomplished prior to the polymerization step, purified acetylene can be brought into contact with the solid catalyst at preferably polymerizaztion-reaction temperature either in concentrated form or in dilution in an inert gas such as nitrogen or a saturated hydrocarbon. The total or partial acetylene pressure should not exceed a few atmospheres. Catalyst should be held in the presence of acetylene under said reaction conditions for a period between about 1 and 30 minutes and preferably between about 5 and 15 minutes. Activated solid catalyst particles in a dense-phase fluid bed can be treated with acetylene and, after acetylene treatment, be transferred into a hydrocarbon solvent reaction medium, preferably an aromatic hydrocarbon, prior to the introduction of the olefin to be polymerized.

The catalyst can, alternatively, be slurried in the solvent reaction medium and both catalyst and solvent be heated to reaction temperature prior to introducing acetylene and olefin, in which case olefin polymerization occurs in the presence of the acetylene treating agent. When the acetylene is introduced with the solvent reaction medium and ethylene, it has been found preferable to introduce the acetylene in a proportion with respect of the ethylene between about 0.1 and 5 weight percent, and since it is usually preferred to employ an ethylene concentration in introduced solvent in an amount between about 5 and 20 percent it is preferable to employ acetylene in an amount between about 0.02 and 0.05 percent by weight of the total feed to the polymerization reactor. In any case, however, the acetylene should be employed in an amount with respect of the catalyst between about 0.01 and 5.0 percent by weight, or preferably between 0.1 and 2.5 percent by weight of catalyst. Relative concentrations of about 5 percent acetylene do not appear to so alter the catalyst or otherwise affect the polymerization reaction adversely; and it has been found that acetylene in mere traces in inert gases will react with the catalyst and consequently condition it.

The polymerization catalyst is a combination of alumina, titania, or zirconia with a molybdenum-oxygen compound in a subhexavalent state, in which each catalyst component is present in an amount of at least 1 percent, and in which the molybdena component is preferably between 5 and 25 percent. The alumina component should be in gamma form and of the type conventionally employed for the manufacture of hydroforming catalysts, the surface area of the alumina, titania, or zirconia component preferably being in the range of 40 to 400 square meters per gram as measured by nitrogen or n-butane adsorption (BET method). The particle size should be preferably of the order of 100 to 200 microns. No novelty is claimed in the catalyst compositions and they are described in more detail in Serial No. 223,641, which also points out the necessity of activating them to ensure the presence of the molybdenum in a subhexavalent state. This activation may be effected by treatment with a reducing gas such as hydrogen at a temperature of about 300° to 650° C. under a pressure of about atmospheric to 500 p. s. i. g. or more for a time ranging from a matter of a few seconds to several hours, depending on the particle size and molybdena content; with particle size of about 100 to 200 microns the activation may be effected in about 1 to 15 minutes or more at a pressure of 50 to 500 p. s. i. of hydrogen.

Generally speaking, the polymerization conditions and reaction media are likewise the same as taught in Serial No. 223,641. Polymerization should be at a temperature in the range of 75° to 325° C. and preferably about 130° to 300° C., under a pressure from 100 up to 5000 p. s. i. g., preferably about 200 to 2000 or about 1000 p. s. i. g., with a liquid hourly space velocity in the range of about .1 to 10 or preferably .5 to 5, e. g., about 2 volumes of olefin plus reaction medium charged per hour per volume of catalyst in the reactor at any time. The reaction medium is preferably an aromatic hydrocarbon such as benzene, toluene, xylene, etc. or mixtures thereof, or a saturated cyclic hydrocarbon such as tetralin or decalin.

When polymerization is completed or, in a continuous process, as reaction mixture is withdrawn from the polymerization reactor, the reaction mixture is settled and/or filtered at elevated temperature, and the filtrate is subsequently cooled and filtered to recover dissolved polymer therefrom. The catalyst and polymer deposited thereon is withdrawn to solvent washing means and is rigorously treated with a hot solvent, preferably the solvent reaction medium, to recover deposited polymer from the catalyst surface. It is this solvent extraction that is so much improved both with respect to ease of separation of polymer from catalyst and with respect to reducing the amount of polymer that must be removed from the catalyst by the improved process of the present invention. The extracted catalyst is customarily dried, in part treated with oxygen, reactivated with hydrogen, and recycled to the polymerization reactor.

The specific viscosity values reported in the specification as $\eta \times 10^5$ were obtained by employing the Staudinger formula (Phys. Chem. 171, 129 (1934)) using 0.125 gram of polyethylene per 100 ml. of boiling xylene at 85° C. for viscosity measurements.

As a demonstration of the problem encountered in recovering polymer from catalyst, ethylene in xylene solution was polymerized in the presence of a molybdena alumina catalyst in the form of $3/16$-inch pills. The catalyst was extracted with boiling xylene for a period of about 16 hours and then only about 80 percent of the polymer that had been deposited on the catalyst was recovered. The polymer had a specific viscosity of $49,000 \times 10^{-5}$ and was obtained in a yield of 0.52 gram of polymer per gram of catalyst. The following examples illustrate the alleviation of this problem of polymer recovery that is provided by the employment of varying quantities of acetylene in the feed. The acetylene had been stored in acetone and was purified particularly for removal of acetone by scrubbing with 85 weight percent sulfuric acid.

*Example 1*

A polymerization reactor was charged with 16.1 parts by weight of a molybdena-alumina catalyst which contained 7.5 percent molybdena and was in the form of $3/16$-inch pills. The catalyst was activated in the reactor by introducing hydrogen at 200 p. s. i. g. and 450° C. for about 10 minutes, evacuating for about 10 minutes, and then repeating the procedure. The activated catalyst was then cooled to 65° C. and the reactor was evacuated. Purified acetylene which had been treated with 85 weight percent sulfuric acid to remove traces of acetone in which the acetylene had been stored was introduced into the reactor in a relative amount of 0.23 percent by weight of catalyst and was maintained therein in contact with the catalyst at a temperature of 65° C. for a period of about 5 minutes. Thereafter 87 parts by weight of xylene was introduced into the reactor and was heated to 235° C. Ethylene was thereafter introduced into the reactor and pumped to a pressure of 930 p. s. i. g. As polymerization progressed, the pressure in the reactor dropped to about 800 p. s. i. g., whereupon further quantities of ethylene were charged to the reactor until a pressure of 930 p. s. i. g. was again established. The process was repeated for a period of 2 hours. The total weight of ethylene introduced into the reactor constituted 14.7 percent of the total weight of the solution, and the weight of acetylene employed constituted 0.038 percent of the weight of the solution. The relative weight ratio of ethylene to acetylene was about 400:1. Ninety-five percent by weight of the total weight of solids that were deposited on the catalyst was removed therefrom by leaching with hot xylene for about 8 hours. Substantially all of the polymer removal occurred in the first three hours, or less than one fourth the time required in the absence of acetylene. The recovered polymer was tough and flexible and had a specific viscosity of $47,500 \times 10^{-5}$.

*Example 2*

The polymerization reactor again was charged with 16 parts by weight of a molybdena-alumina catalyst, $3/16$-inch pills containing 7.5 percent molybdena. The catalyst was activated with hydrogen in the manner described in Example 1 and purified acetylene was introduced in a relative amount of 0.66 weight percent of the catalyst. The acetylene was maintained in contact with the catalyst for a period of about 5 minutes and at a temperature of 66° C. Eighty-seven parts by weight of xylene was then introduced into the reactor and ethylene in a total relative amount of 14.7 weight percent of the total solution was intermittently introduced, as in Example 1, to maintain a pressure of 930 p. s. i. g. The polymerization was effected at a temperature of 238° C. The relative amount of acetylene employed with respect of ethylene was about 0.7 percent by weight, or 0.106 percent of the total weight of the solution.

Ninety percent of the polymer that was deposited on the catalyst was removed by leaching the catalyst with hot xylene for about 8 hours. However, substantially no further removal occurred after the first three hours. The polymer, which was obtained in a yield of 0.59 gram of polymer per gram of catalyst, was tough and flexible and had a specific viscosity of $35,400 \times 10^{-5}$.

*Example 3*

The polymerization reactor was again charged with 16 parts by weight of the pilled molybdena-alumina catalyst, the catalyst was activated with hydrogen, and purified acetylene in the relative weight of 2 percent of the weight of catalyst was introduced into the reactor and was maintained therein under a pressure of acetylene of about $2/3$ of an atmosphere and a temperature of 66° C. for a period of about 5 minutes. 87 parts by weight of xylene was then fed to the reactor and ethylene in an amount of 14.7 weight percent of the total weight of feed was intermittently introduced into the reactor to maintain a pressure between 800 and 930 p. s. i. g. Polymerization was effected within the same pressure and temperature limits as employed in Example 1.

About 92 percent by weight of the polymer that was deposited on the catalyst was extracted therefrom by leaching the catalyst with hot xylene for 8 hours, less than half the time required when no acetylene was used; furthermore, substantially all of the polymer was removed after 3 hours leaching. A tough and flexible polymer in a yield of 0.4 grams of polymer per gram of catalyst, having a specific viscosity of $41,000 \times 10^{-5}$ was obtained.

The foregoing examples show that quantities of acetylene as high as 2 percent by weight of catalyst have no deleterious effect on the polymer. It is, of course, important that impurities are not introduced into the polymerization system whether by pretreatment of the catalyst or introduction in the feed stock, and whether as a contaminant of the acetylene or of other constituents of the feed stock. Purified acetylene in concentrations as high as about 5 percent of the weight of olefin polymerized does not cause substantial interference with product yield or quality. It is also possible, as shown by the foregoing examples, to introduce undiluted acetylene into the reactor in the desired relative amounts, in which case the acetylene pressure is preferably kept below atmospheric, and thereby condition the catalyst so that polymer is readily separable therefrom, without interfering with product yield or quality. Acetylene diluted in a stream of inert gas such as nitrogen, methane, ethane, or propane, can equally well be employed at elevated pressures in which the partial pressure of the acetylene corresponds to the desired relative amount of acetylene with respect of catalyst. It follows that in the same manner the acetylene can be introduced with the olefin or in solution in the reaction medium in that amount corresponding to a relative weight of acetylene between about 0.01 and 5.0 percent of the total catalyst weight.

Having described my invention, I claim:

1. An improved process of polymerizing ethylene to form high molecular weight polyethylene that is readily extractable from catalyst surfaces, the said process comprising: introducing ethylene and between 0.1 and 5 percent by weight thereof of acetylene into a polymerization zone and into contact with an activated catalyst which, before activation, comprises essentially at least one weight percent each of a hexavalent molybdenum-oxygen compound and a metal oxide selected from the group consisting of gamma alumina, titania and zirconia, activation of said catalyst having been effected by partially reducing said hexavalent molybdenum-oxygen compound, when present on said metal oxide, with a reducing gas at a temperature of at least about 300° C.; maintaining the ethylene, acetylene, and catalyst in contact in the presence of a liquid hydrocarbon reaction medium at a temperature between 75° and 325° C., at a pressure between about atmospheric and 5000 pounds per square inch gauge, and for a period equivalent to a liquid hourly space velocity between 0.1 and 10 to effect polymerization of ethylene; continuously withdrawing effluent comprising polyethylene, reaction medium, and catalyst from the said polymerization zone; separating catalyst from the said effluent and treating catalyst with a hydrocarbon solvent at an elevated temperature to remove deposited polyethylene from catalyst surfaces; and cooling withdrawn reaction medium and separating further quantities of polyethylene therefrom.

2. An improved process of polymerizing ethylene to form high molecular weight polyethylene that is readily extractable from catalyst surfaces, the said process comprising: introducing ethylene containing between 0.1 and 5 percent by weight thereof of acetylene into a polymerization zone and into contact with an activated catalyst which, before activation, comprises essentially at least one weight percent each of a hexavalent molybdenum-oxygen compound and a metal oxide selected from the group consisting of gamma alumina, titania and zirconia, activation of said catalyst having been effected by partially reducing said hexavalent molybdenum-oxygen compound, when present on said metal oxide, with a reducing gas at a temperature of at least about 300° C.; introducing the acetylene at a rate to maintain the relative weight of acetylene with respect to catalyst between 0.1 and 2.5 percent; maintaining the ethylene, acetylene, and catalyst in contact in the presence of a liquid hydrocarbon reaction medium at a temperature between 75° and 325° C., at a pressure between about atmospheric and 5000 pounds per square inch gauge, and for a period equivalent to a liquid hourly space velocity between 0.1 and 10 to effect polymerization of ethylene; continuously withdrawing effluent comprising polyethylene, reaction medium, and catalyst from the said polymerization zone; separating catalyst from the said effluent and treating catalyst with a hydrocarbon solvent at an elevated temperature to remove deposited polyethylene from catalyst surfaces; cooling reaction medium and solvent extraction medium and recovering polyethylene from each; regenerating so-extracted catalyst and recycling the same to the polymerization zone.

3. The process which comprises subjecting a catalyst of molybdena supported upon an oxide selected from the group consisting of gamma alumina, titania and zirconia to treatment with hydrogen at a temperature between about 300° C. and about 650° C., evacuating said catalyst, thereafter treating said catalyst with between about 0.01 and about 5 percent by weight of acetylene, thereafter contacting said catalyst with a hydrocarbon solvent and between about 5 and about 20 percent by weight of ethylene, based on the weight of said hydrocarbon solvent, at a polymerization temperature between about 75° C. and about 325° C., separating catalyst containing high molecular weight polyethylene from the reaction mixture, and extracting said polyethylene from said catalyst.

4. The process of claim 3 wherein said oxide is gamma alumina.

5. The process of claim 3 wherein said oxide is gamma alumina and contact of acetylene with said catalyst is effected at a temperature between about room temperature and about 325° C.

6. The process of claim 5 wherein the molybdena component of said catalyst constitutes between about 5 and about 25 weight percent.

7. The process of claim 6 wherein said hydrocarbon solvent is a low boiling aromatic hydrocarbon.

8. In a process for producing a solid polymer by contact of a charging stock selected from the group consisting of ethylene, propylene, and mixtures of ethylene and propylene in the presence of a liquid hydrocarbon reaction medium at an elevated temperature and pressure with an activated catalyst which, before activation, comprises essentially at least one weight percent each of a hexavalent molybdenum-oxygen compound and a metal oxide selected from the group consisting of gamma alumina, titania and zirconia, activation of said catalyst having been effected by partially reducing said hexavalent molybdenum-oxygen compound, when present on said metal oxide, with a reducing gas at a temperature of at least about 300° C., the improvement which comprises contacting said activated catalyst with between about 0.01 and about 5 percent by weight of acetylene.

9. The process of claim 8 wherein said hexavalent molybdenum-oxygen compound is molybdenum trioxide and wherein said metal oxide is an activated adsorptive gamma alumina.

10. The process of claim 8 wherein contacting of acetylene with said activated catalyst is effected at a temperature between about room temperature and about 325° C.

11. The process of claim 8 wherein contacting of acetylene with said activated catalyst is effected prior to contact of said catalyst with said charging stock.

12. The process of claim 8 wherein contact of acetylene with said catalyst is effected during contact of said charging stock with said activated catalyst.

13. The process of claim 8 wherein acetylene is employed in admixture with an inert gas.

14. The process of claim 8 wherein contacting of said activated catalyst with acetylene is continued for a period between about 1 and about 30 minutes.

15. The process of claim 8 wherein said reducing gas is hydrogen and the activation of said catalyst is effected at a temperature between about 300° C. and about 650° C.

16. The process of claim 8 wherein said reaction medium is an aromatic hydrocarbon.

No references cited.